United States Patent
Harrell

(10) Patent No.: US 6,942,111 B2
(45) Date of Patent: Sep. 13, 2005

(54) TROLLEY DEVICE AND METHOD FOR TRANSPORTING ARTICLES ALONG A RAIL SYSTEM

(76) Inventor: Rodney Harrell, 2054 Citrus Ave., Jessup, MD (US) 20794

( * ) Notice: Subject to any disclaimer, the term of this patent is extended or adjusted under 35 U.S.C. 154(b) by 50 days.

(21) Appl. No.: 10/351,431

(22) Filed: Jan. 27, 2003

(65) Prior Publication Data

US 2004/0089623 A1 May 13, 2004

Related U.S. Application Data

(60) Provisional application No. 60/425,631, filed on Nov. 13, 2002.

(51) Int. Cl.[7] .................................................. A47F 5/08
(52) U.S. Cl. ..................................................... 211/113
(58) Field of Search ............................... 211/113, 116, 211/162, 119

(56) References Cited

U.S. PATENT DOCUMENTS

| | | | |
|---|---|---|---|
| 2,557,627 A | * | 6/1951 | Baril |
| 3,587,473 A | | 6/1971 | Weiss et al. |
| 4,079,840 A | | 3/1978 | Usner |
| 4,140,163 A | | 2/1979 | Usner |
| 4,557,516 A | | 12/1985 | Usner |
| 4,779,746 A | | 10/1988 | Usner |
| 4,872,568 A | * | 10/1989 | Lehmann |
| 5,000,309 A | | 3/1991 | Dooley |
| 5,050,833 A | | 9/1991 | Usner |
| 5,072,837 A | * | 12/1991 | Rosch |
| 5,107,996 A | | 4/1992 | Whittaker |
| 5,226,525 A | | 7/1993 | Dooley |
| 5,303,815 A | | 4/1994 | Dooley |
| 5,415,299 A | | 5/1995 | Usner |
| 5,501,345 A | | 3/1996 | Hilstolsky et al. |
| 5,836,486 A | * | 11/1998 | Ohsugi |

* cited by examiner

*Primary Examiner*—Sarah Purol
(74) *Attorney, Agent, or Firm*—Edell, Shapiro & Finnan

(57) ABSTRACT

A trolley according to the present invention is utilized to transport garments or other articles over a rail system between desired locations. The trolley includes a support member and a plurality of trolley heads each disposed at a corresponding support member end. The trolley heads each include a housing with rollers disposed therein and an arm that connects that trolley head to a corresponding end of the support member. The rollers engage a slick rail system to enable the trolley, with the support member in a generally horizontal orientation, to traverse the rail system and transport garments suspended from the support member. One of the trolley ends includes a pivoting mechanism that enables the support member to pivot or swivel with respect to the trolley arm at that end to place the support member in a generally vertical position.

23 Claims, 3 Drawing Sheets

TROLLEY DEVICE AND METHOD FOR TRANSPORTING ARTICLES ALONG A RAIL SYSTEM

CROSS-REFERENCE TO RELATED APPLICATIONS

This application claims priority from U.S. Provisional Patent Application Ser. No. 60/425,631, entitled "Trolley Device and Method for Transporting Articles Along a Rail System" and filed Nov. 13, 2002, the disclosure of which is incorporated herein by reference in its entirety.

BACKGROUND OF THE INVENTION

1. Technical Field

The present invention pertains to systems for transporting garments or other articles. In particular, the present invention pertains to a trolley device for transporting garments or other articles over a rail system, wherein the trolley device includes an article support member that pivots between orientations for article transportation and/or storage.

2. Discussion of Related Art

Generally, garments are transported between desired locations in the garment trade (e.g., from warehouse to retailer, from retailer warehouse to sales floor, from truck or other transport vehicle to warehouse, etc.) for various purposes (e.g., in order to conduct business, for storage, etc.). The transportation of garments or other articles is typically accomplished by a slick rail system that extends between the desired locations. Transport devices suspend the garments and engage the rail system to transport the garments in a desired fashion between locations. The related art provides various types of devices for transporting and/or suspending garments from a rail or rod. For example, U.S. Pat. No. 3,587,473 (Weiss et al) discloses a trolley hanger assembly for carrying garment-laden hangers along a trolley rail. The assembly includes two spaced-apart arms with a bearing housing rotatably attached to each of the arms. The two bearing housings each have two sets of rollers for engaging the trolley rail. A carrying rod is hingedly attached to the arms for carrying the garments.

U.S. Pat. No. 5,050,833 (Usner) discloses a garment rope gang-sling hook device characterized by the hook having disposed thereon three small, low-friction, ball or roller bearing rollers having substantially flat rolling surfaces. The rollers are disposed in fixed position on the crook of the hook where the axis of rotation of the centrally disposed roller forms an angle between 30° and 89° with the axes of rotation of each flanking roller, respectively.

U.S. Pat. No. 5,107,996 (Whittaker) discloses a garment supporting apparatus for the efficient suspension of articles of clothing in a constricted space. The apparatus comprises a brace element with a pivotally engageable mounting hook on each end for attaching to a garment rod. The brace element includes a series of spaced apart holes for suspending a number of clothes hangers and a series of laterally projecting integral hooks, along at least one longitudinal edge, for suspending a further number of clothes hangers where one of the mounting hooks is released from the rod.

U.S. Pat. No. 5,501,345 (Hilstolsky et al) discloses a garment holder assembly that supports garments while being disposed in either of two different attitudes. The assembly includes an elongated rigid support structure with a plurality of spaced, interior dividers. A hook extends from one or more dividers to support the garment holder assembly in a horizontal attitude, where the hooks may be utilized to suspend the support structure in that attitude from a trolley engaging a rail system A link secured to one end of the support structure can be connected to a roller hook engaging the rail system for supporting the assembly in a vertical attitude.

The related art devices suffer from several disadvantages. In particular, the Weiss et al and Usner devices are generally limited to suspending garments in a single orientation. However, different respective orientations are optimal for garment transport and storage. For example, a horizontal orientation is preferable for garment transport and/or storage during extended time intervals to minimize garment damage, while a vertical orientation is preferable for temporary garment storage (e.g., within a truck or other facility) to efficiently utilize storage space. Since these devices may transport and/or store garments in a single orientation, the garments are typically transferred from the devices to a desired location or other device to attain an optimal orientation for a particular application, thereby increasing the tediousness and/or complexity of the task. Although the Whittaker and Hilstolsky et al devices may suspend garments in horizontal and vertical orientations, the Whittaker device is limited to garment storage applications, while both devices do not provide a mechanism to lock the device in a particular orientation. Thus, the devices may inadvertently transition between orientations at inopportune times and cause damage to garments and/or injury to operators. Further, the Hilstolsky et al device utilizes several independent components (e.g., roller hook, support structure and trolley) to transition between orientations and facilitate garment transport along the rail system and/or garment storage, thereby increasing complexity and costs. Moreover, the weight of the garments suspended by the Hilstolsky et al device may require substantial effort (e.g., a plurality of persons) to transition the device between orientations, thereby degrading efficiency and/or requiring additional personnel to complete the task.

OBJECTS AND SUMMARY OF THE INVENTION

Accordingly, it is an object of the present invention to transport garments or other articles between desired locations over a rail system via a trolley including a pivoting end to transition the trolley between appropriate orientations for garment transport and/or storage.

It is another object of the present invention to maintain the trolley in a particular orientation via a locking mechanism.

Yet another object of the present invention is to transport garments or other articles between desired locations over a rail system via an integrated single trolley unit with a pivoting end.

Still another object of the present invention is to enable a single person to pivot the trolley end to transition the trolley between appropriate orientations for garment transport and/or storage.

The aforesaid objects may be achieved individually and/or in combination, and it is not intended that the present invention be construed as requiring two or more of the objects to be combined unless expressly required by the claims attached hereto.

According to the present invention, a trolley is utilized to transport garments or other articles over a rail system between desired locations (e.g., from warehouse to retailer, from retailer warehouse to sales floor, etc.). The trolley includes a support member and a plurality of trolley heads each disposed at a corresponding support member end. The trolley heads each include a housing with rollers disposed therein and an arm that connects that trolley head to a corresponding end of the support member. The rollers engage a slick rail system to enable the trolley, with the support member in a generally horizontal orientation, to traverse the rail system and transport garments suspended from the support member. One of the trolley ends includes a pivoting mechanism that enables the support member to pivot or swivel with respect to the trolley arm at that end to place the support member in a generally vertical position. Basically, when the trolley reaches a rail terminal point (e.g., for transfer from a warehouse to a trailer), a user lifts the non-swivel end from the rail, while the swivel end pivots to position the support member vertically for placement at a target site (e.g., truck or tractor-trailer). The process may be reversed to enable the trolley to traverse the rail system from a source site (e.g., truck or tractor-trailer) to an intended site (e.g., warehouse).

The above and still further objects, features and advantages of the present invention will become apparent upon consideration of the following detailed description of specific embodiments thereof, particularly when taken in conjunction with the accompanying drawings, wherein like reference numerals in the various figures are utilized to designate like components.

DETAILED DESCRIPTION OF THE PREFERRED EMBODIMENTS

Figure 1:
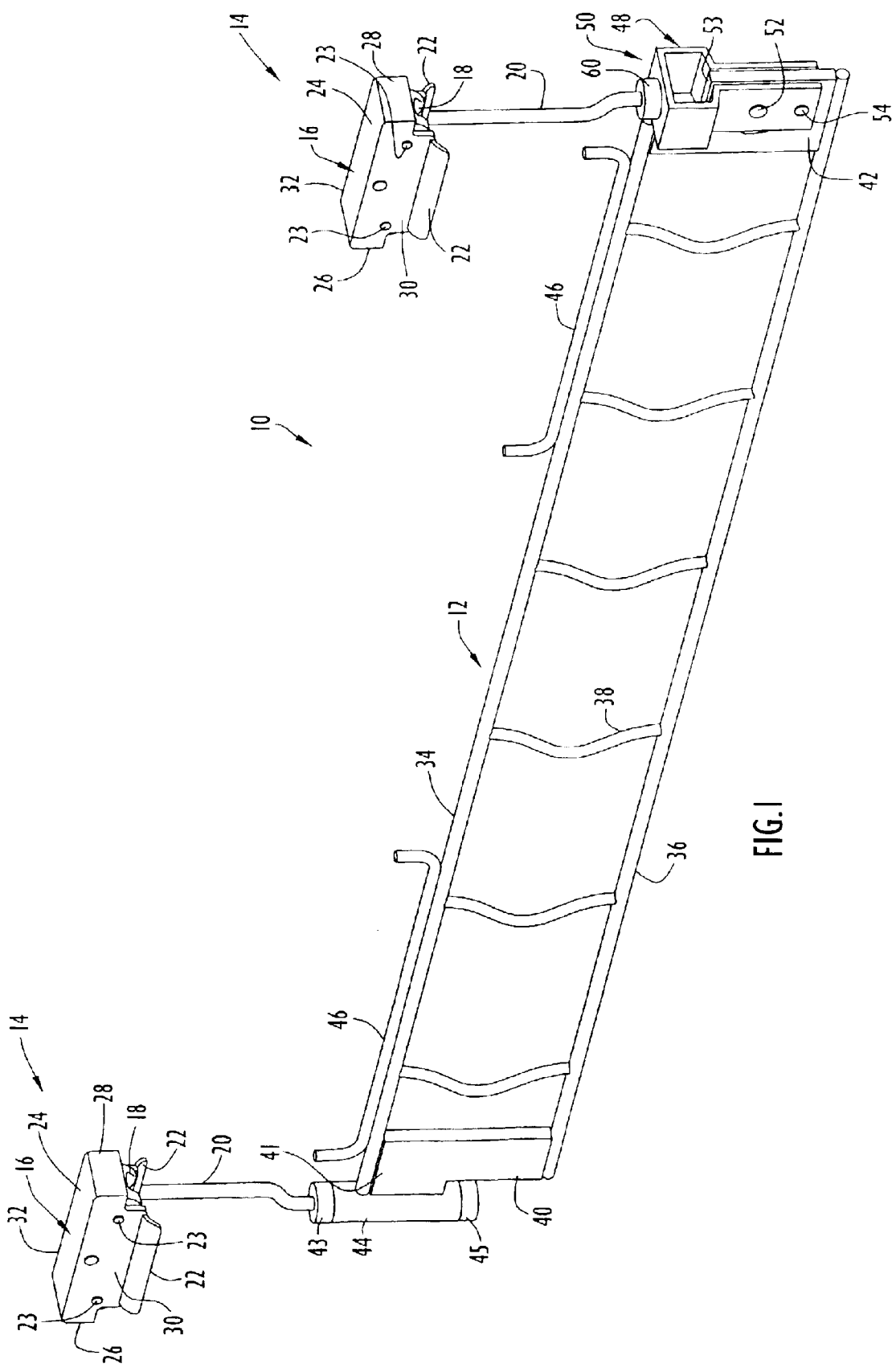
FIG. 1 is perspective view of a rail system trolley according to the present invention.
Figure 3:
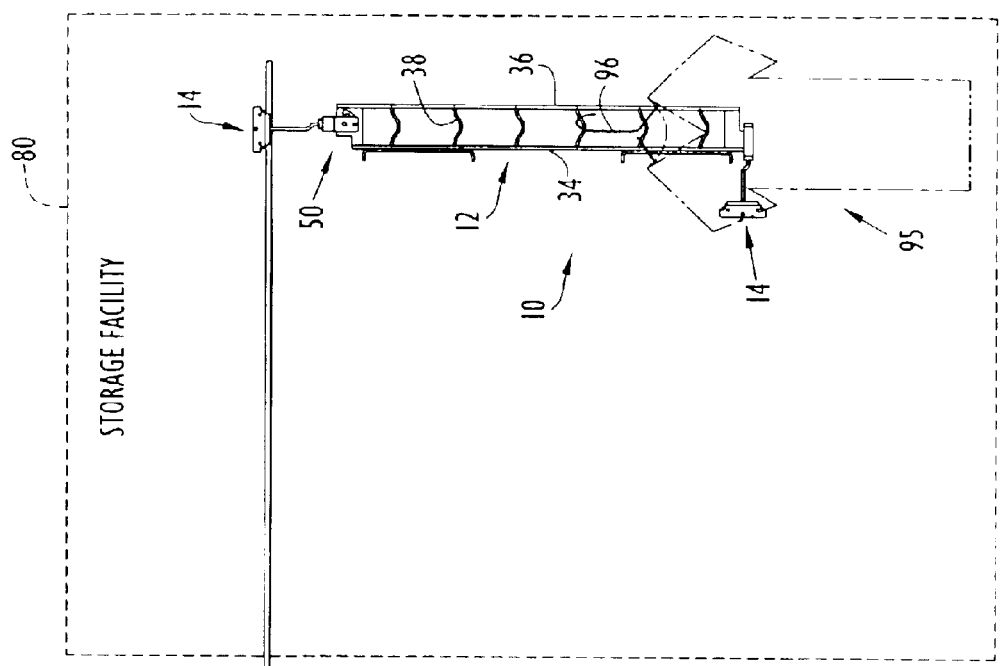
FIG. 3 is a diagrammatic perspective view of the trolley of FIG. 1 disposed on a rail system and transitioning between orientations for transportation and storage of articles according to the present invention.
Figure 3:
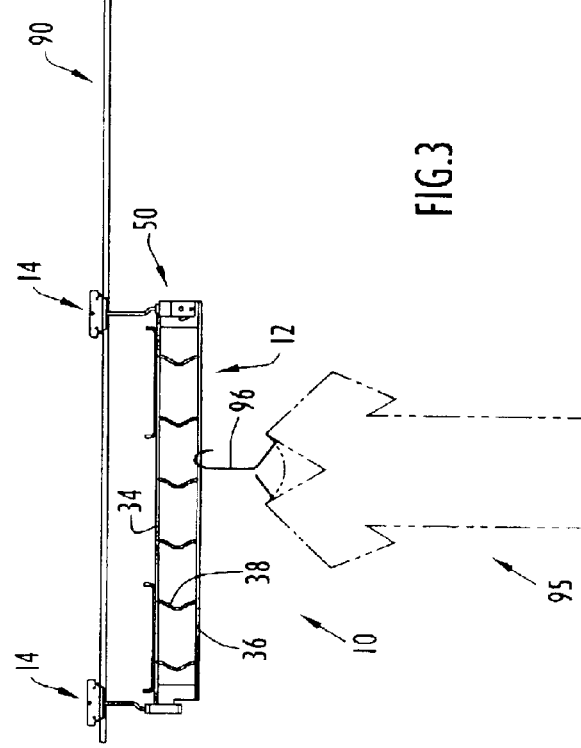

A trolley of the present invention to transport hanging garments or other articles between desired locations (e.g., from warehouse to retailer, from retailer warehouse to sales floor, etc.) along a slick rail system is illustrated in FIG. 1. Specifically, trolley 10 includes a support member 12 and a plurality of trolley heads 14, each disposed at corresponding support member end. The trolley heads each include a housing 16 with a pair of rollers 18 disposed therein. Rollers 18 are disposed horizontally adjacent within housing 16 via pins 23 and each roller rotates about a corresponding pin and includes a generally 'V'-shaped or recessed surface to enhance engagement with the rail system (FIG. 3). Housing 16 includes a top wall 24, side walls 26, 28, a front wall 30 and a rear wall 32 that collectively define a housing interior with an open bottom portion. The front, rear and side walls partially cover rollers 18, and along with the housing open bottom portion, enable the rollers to engage the rail system. The housing front and rear walls each include a rail guide 22 attached to respective bottom edges of those walls to stabilize the trolley heads on the rail system. Each trolley head further includes an arm 20 that is attached to housing 16 and connects that trolley head to a corresponding end of the support member. The arms are substantially cylindrical and include a generally question mark or 'C'-shaped type configuration. The trolley heads are typically conventional components, such as the types available from White Systems and/or disclosed in U.S. Pat. No. 3,587,473 (Weiss et al), the disclosure of which is incorporated herein by reference in its entirety. The trolley heads basically engage the rail system (e.g., in a manner substantially similar to that of the trolley hanger assembly disclosed in the aforementioned Weiss et al patent) to enable the trolley, with the support member in a generally horizontal orientation, to transport garments or other articles suspended from the support member between desired locations as described below.

Support member 12 is in the form of a frame and includes upper and lower rods 34, 36, a series of dividers 38, a head plate 40 and a pivot plate 42 of a pivoting mechanism 50. Upper and lower rods 34, 36 are generally cylindrical and arranged substantially in parallel separated by a predetermined distance. By way of example only, the upper and lower rods each include a diameter of approximately three-eighths of an inch and a length or longitudinal dimension of approximately three feet, and are separated by a distance of approximately three inches. However, these support member components may be of any shape or size and may be arranged in any fashion. Head plate 40 is attached to and between the upper and lower rods at a fixed or non-pivoting end of the support member. The head plate is generally rectangular and includes a substantially rectangular projection 41 extending transversely from a head plate upper portion and beyond the terminal edge of lower rod 36. Upper rod 34 is attached to the top edge of head plate 40, while a substantially cylindrical receptacle 44 is attached to the terminal edges of projection 41 and upper rod 34 to receive arm 20 of a corresponding trolley head 14. The receptacle includes a diameter greater than that of the arm, where the arm lower portion is disposed through the receptacle. A generally annular upper fastener 43 including dimensions greater than those of the receptacle is secured to an intermediate arm portion and basically serves as a stop to prevent further insertion of the arm within the receptacle. A generally annular lower fastener 45, substantially similar to upper fastener 43, is secured to the arm portion extending through and beyond the receptacle lower end. The fasteners basically secure the arm within the receptacle for attachment to the support member.

The opposing or pivoting end of the support member includes pivot plate 42 (FIG. 2) attached to and between the upper and lower rods. The pivot plate is generally rectangular with a truncated upper corner portion forming a recessed step or shoulder 53. By way of example only, the pivot plate includes a length or longitudinal dimension of approximately three inches and a width or transverse dimension of approximately two inches, while the shoulder is recessed approximately three quarters of an inch and includes a width or transverse dimension of one and one-eighth inches. However, the pivot plate may be of any size or shape. Upper rod 34 is attached to the pivot plate upper edge and terminates toward shoulder 53, while lower rod 36 is attached to the pivot plate bottom edge and terminates at the plate terminal side edge, thereby extending beyond upper rod 34. The pivot plate further includes slots 56, 58 (FIG. 2) to enable pivoting of the support member as described below. A bracket or clevis 48 is secured to the pivot plate through slots 56, 58. By way of example only, the bracket includes a length or longitudinal dimension of approximately three inches and a width or transverse dimension of approximately one and one-eighth inches. However, the bracket may be of any size or shape. Arm 20 of a corresponding trolley head 14 is disposed through the bracket top surface via an opening (not shown). A generally annular securing member 60, substantially similar to fasteners 43, 45 and including dimensions greater than those of the arm and opening, is secured to an arm intermediate portion and basically serves as a stop to prevent further insertion of the arm into the bracket. A corresponding securing member (not shown), substantially similar to securing member 60, is secured to the arm adjacent the opening on the underside of the bracket top surface to attach the arm to the bracket and support member.

Dividers 38 are attached to and between upper and lower rods 34, 36 and are spaced apart within the support member interior along a support member longitudinal axis. The dividers are substantially cylindrical and include a generally curved central portion or 'V'-shaped configuration. By way of example only, the dividers each include an approximate diameter of five-sixteenths of an inch; however, the dividers may be of any shape or size and may be configured in any fashion. The dividers are utilized to partition the support member interior into individual areas for particular articles and to support the articles when the support member pivots from a generally horizontal to a generally vertical orientation as described below.

Covering posts 46 are each attached to an upper surface of upper rod 34 toward a corresponding support member end. Posts 46 are generally cylindrical and are arranged in a generally 'U'-shaped configuration with the transverse portions of the posts extending away from the upper rod. By way of example only, the posts each include an approximate diameter of a quarter of an inch, while the rod transverse portions each extend for an approximate length of three quarters of an inch. However, the posts may be of any size or shape, and may be configured in any fashion. The posts are typically utilized to maintain conventional garment bags or other coverings (not shown) over the garments or articles suspended from the support member. Basically, the coverings are placed over the support member and secured to posts 46 by conventional fasteners (e.g., rope, hook and loop fasteners, etc.), while the covering hangs down therefrom to protect the garments or articles.

Figure 2:
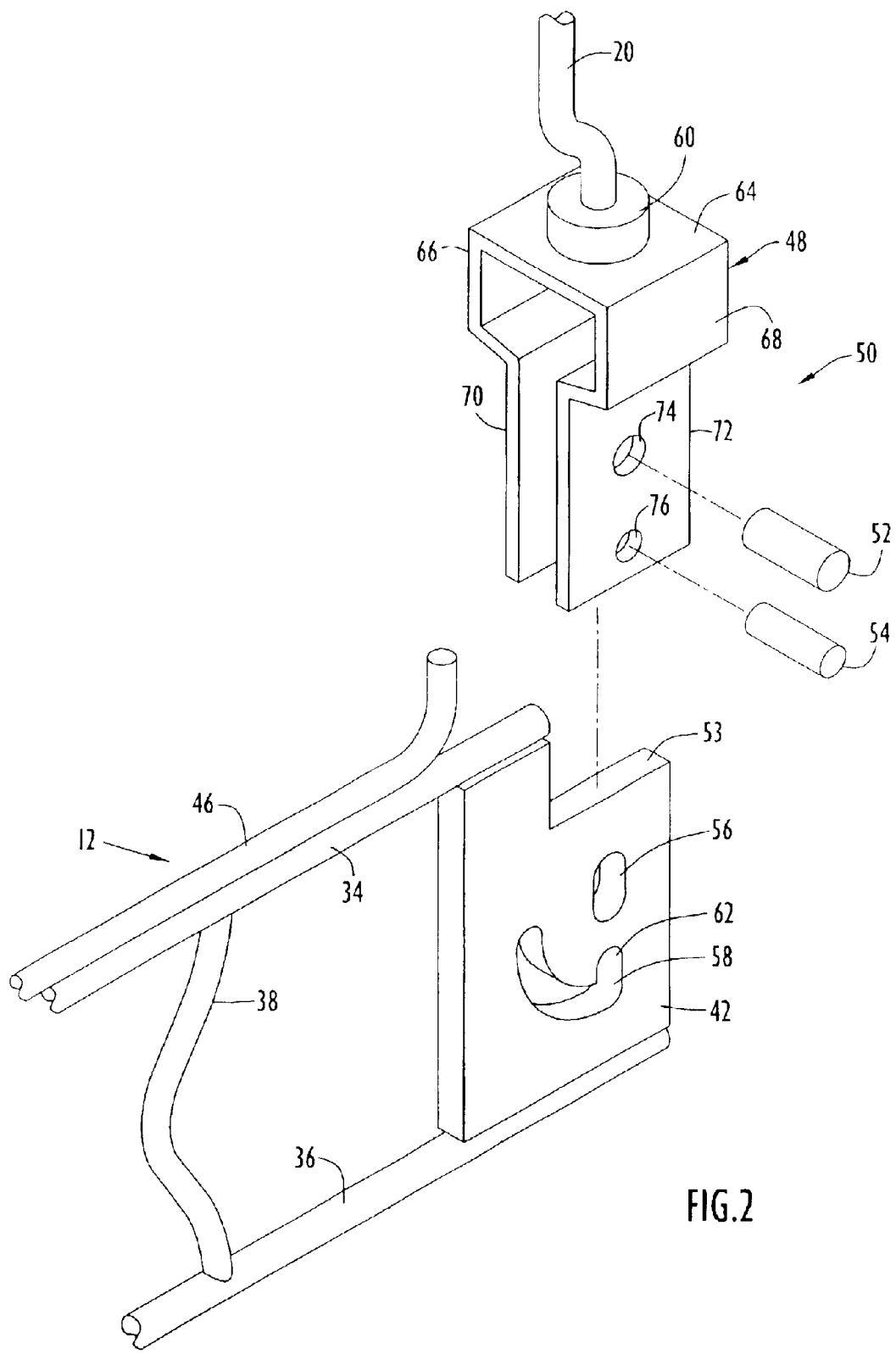
FIG. 2 is an exploded view in perspective of the pivoting mechanism of the trolley of FIG. 1.

The support member is typically oriented in a horizontal fashion (e.g., as shown in FIG. 1) when transporting articles over the rail system. However, in order to reduce the area occupied by the trolley and garments for storage purposes, the support member may pivot with respect to a corresponding trolley head via pivoting mechanism 50. Referring to FIG. 2, pivoting mechanism 50 includes pivot plate 42 and bracket 48. The bracket is secured to pivot plate 42 and includes a top panel 64, a rear panel 66, a front panel 68 and legs 70, 72 collectively providing open side portions. The securing members are secured to a corresponding trolley head arm 20 proximate top panel 64 to attach that arm to the bracket and support member as described above. Legs 70, 72 include a generally 'L'-shaped configuration, where the transverse leg portions are attached to corresponding rear and front panels 66, 68 and extend inwardly therefrom. The longitudinal portions of legs 70, 72 extend downward from the transverse portions substantially in parallel. Each leg longitudinal portion includes openings 74, 76 defined therein. Opening 74 is defined in an upper portion of each leg toward the transverse portion, while opening 76 is defined below opening 74. The openings of leg 70 are substantially aligned with the openings of leg 72, while the legs are separated by a distance sufficient to receive pivot plate 42 therebetween. Bracket 48 is placed over pivot plate 42 of the support member coincident recessed shoulder 53 with openings 74, 76 of each leg respectively aligned with slots 56, 58 defined in the pivot plate. A pin 52 is disposed through aligned openings 74 and slot 56, while a pin 54 is disposed through aligned openings 76 and slot 58. The pins are each substantially cylindrical and typically welded to the bracket to secure the bracket to the support member. By way of example only, pin 54 includes a diameter of approximately a quarter of an inch, while pin 52 includes a diameter of approximately five sixteenths of an inch. Slots 56 and 58 include dimensions slightly greater than the dimensions of respective pins 52, 54 to enable the support member to pivot as described below. However, the pins and slots may be of any shape or size.

Slot 56 is generally elliptical having a major axis extending between the upper and lower rods. Slot 58 is generally arcuate and includes a notch 62. The notch is typically disposed below slot 56, while slot 58 extends from the notch in a curved fashion toward upper rod 34. Pins 52, 54 respectively traverse slots 56, 58 to enable the support member to pivot. In particular, when the trolley is transporting articles along a rail system, the support member is in a generally horizontal orientation (FIG. 1). In this case, the support member weight enables pin 52 to be positioned within the upper portion of slot 56 and pin 54 to be located in notch 62. The notch prevents traversal of pin 54 through slot 58 to lock the support member in this orientation. In order to pivot the support member to a generally vertical orientation, the support member is lifted by a user, thereby enabling pin 52 to be positioned within the lower portion of slot 56 and enabling pin 54 to withdraw from notch 62. As the support member is lowered by the user to a generally vertical orientation, pin 54 traverses arcuate slot 58, while the support member rotates about pin 52. Once the support member is in a generally vertical orientation, pin 54 is positioned at a terminal portion of slot 58.

The process is basically reversed to return the support member to a generally horizontal orientation. In particular, the user lifts the support member, where pin 54 traverses slot 58 toward notch 62 and the support member rotates about pin 52. When the support member is substantially horizontal, the support member weight enables pin 52 to be positioned in an upper portion of slot 56 and pin 54 to enter notch 62, thereby locking the support member in this orientation as described above.

Operation of the trolley is described with reference to FIG. 3. Initially, trolley 10 is utilized with a rail system to transport garments or other articles. The rail system includes at least one rail 90 that extends between desired locations (e.g., warehouse, trailer, sales floor, etc.) for the articles. The rail system may further extend within the desired locations for transport and/or storage of the articles at those locations. Trolley heads 14 are positioned to engage and suspend the trolley from rail 90, while the support member is oriented in a generally horizontal fashion with pin 52 (FIG. 2) in an upper portion of slot 56 and pin 54 in notch 62 as described above. By way of example only, one or more garments 95 (e.g., shirts, pants, jackets, coats, dresses, suits, etc.), typically disposed on conventional closet or other hangers 96, are suspended from support member 12. Basically, the garment hanger engages lower rod 36 to suspend a corresponding garment therefrom. Dividers 38 partition the support member interior into individual areas to enable the garments to be grouped or placed in particular areas on the support member in any desired fashion (e.g., based on the type of garment, size, etc.). In particular, a user manually loads the trolley with garments 95 and causes the trolley to traverse rail 90 toward an intended destination, preferably a storage facility 80 (e.g., warehouse, trailer, truck, etc.). In order to conserve space in the storage facility, it is preferable to position the support member in a generally vertical orientation. Accordingly, when the trolley is located along rail 90 proximate or within the storage facility, the user lifts the support member to basically disengage the fixed trolley head from the rail. This enables pin 54 to withdraw from notch 62 and facilitate rotation of the support member. The user subsequently lowers the support member fixed or non-pivoting end, thereby causing pin 54 to traverse slot 58 and enabling the support member to rotate about pin 52 until the support member attains a generally vertical orientation. As the support member is lowered, gravitational forces enable garment hangers 96 to engage dividers 38, where the dividers basically support the garments when the support member is positioned in the vertical orientation. Once the support member attains the vertical orientation, the user may cause the trolley to further traverse the rail for placement within the storage facility.

In order to retrieve the trolley from the storage facility to transport articles over rail 90, the user initially moves the trolley along rail 90 from the storage facility to a suitable rail location and lifts the lower end of the vertically oriented support member in order to place the fixed or non-pivoting trolley head on the rail. This causes pin 54 to traverse slot 58 toward notch 62, while the support member rotates about pin 52. In addition, gravitational forces with respect to the change in orientation enable the garment hangers to engage lower rod 36. When the support member attains a generally horizontal orientation, the weight of the support member enables pin 54 to enter notch 62 and lock the support member in a generally horizontal orientation as described above. Once the support member is positioned in a generally horizontal orientation, the user may move the trolley along rail 90 to the desired location.

It will be appreciated that the embodiments described above and illustrated in the drawings represent only a few of the many ways of implementing a trolley device and method for transporting articles along a rail system.

The trolley may transport and/or store any types of garments (e.g., pants, shirts, coats, jackets, skirts, suits, etc.) or other articles over any type of rail system (e.g., slick rail, etc.). The articles may be loaded onto the support member manually or via a loading device or machine and may be suspended from the support member by hangers or any other types of suspension devices (e.g., hooks external or integral with the trolley, rope, clamps, etc.). The trolley may be of any shape or size and may be constructed of any suitable materials (e.g., metals, steel, plastics, etc.).

The trolley may include any quantity of any types of conventional or other heads disposed at any suitable locations. The heads may be of any shape or size and may be constructed of any suitable materials (e.g., metals, steel, plastics, etc.). The heads may include any quantity of rollers of any shape or size disposed therein at any locations in any desired arrangement via any securing mechanisms (e.g., pins, brackets, etc.). The housing may be of any shape or size and may include open portions at any locations suitable to enable the rollers to engage the rail system. The guides may be of any shape or size and may be disposed at any locations. The arms may be of any quantity, shape (e.g., cylindrical, tubular, bar, etc.) or size, may include any type of configuration (e.g., C-shaped, question mark, linear or curved rod, etc.) and may be constructed of any suitable materials. The arms may be fastened to the support member and/or attached to the housings at any suitable locations via any type of conventional or other securing mechanisms (e.g., clamps, brackets, receptacles, fasteners, welding, etc.).

The support member may be of any quantity, shape or size and may be constructed of any suitable materials. The rods may be of any quantity, shape (e.g., cylindrical, tubular, bar, etc.) or size, may include any type of configuration and may be constructed of any suitable materials (e.g., metals, steel, plastics, etc.). The rods may be arranged in any desired fashion and may be separated by any distance. The dividers may be of any quantity, shape (e.g., cylindrical, tubular, bar, etc.) or size, and may be disposed at any desired locations. The dividers may include any type of configuration (e.g., V-shaped, linear or curved rod, etc.) and may be constructed of any suitable materials (e.g., metals, steel, plastics, etc.). The dividers may be arranged in any desired fashion and may be separated by any distance. The head plate may be of any quantity, shape or size, may be disposed at any suitable locations and may be constructed of any suitable materials (e.g., metals, steel, plastics, etc.). The projection may be of any quantity, shape or size and may be disposed at any suitable location on the head plate. The receptacle may be of any quantity, shape or size, may be disposed at any suitable locations and may be constructed of any suitable materials (e.g., metals, steel, plastics, etc.).

The pivot plate may be of any quantity, shape or size, may be disposed at any suitable locations and may be constructed of any suitable materials (e.g., metals, steel, plastics, etc.). The shoulder may be of any quantity, shape or size and may be disposed at any suitable location on the pivot plate. The pivot plate may include any quantity of any types of slots of any shape or size disposed at any suitable locations on the pivot plate. The curved slot may include any quantity of notches of any shape or size disposed at any locations to lock the support member at varying orientations. The pins may be of any quantity, shape or size and may be constructed of any suitable materials.

The bracket may be implemented by any quantity of any conventional or other bracket (e.g., clevis, clamp, hooks, bracket, etc.). The bracket components (e.g., panels, legs, etc.) may be of any quantity, shape or size, may be arranged in any fashion and may be constructed of any suitable materials. The leg openings may be of any quantity, shape or size and may be disposed at any suitable locations. The bracket may be connected to the support member at any desired locations. The fasteners and securing members may be any quantity of any type of conventional or other fastener (e.g., threaded or other nut, clamp, pin, etc.) to secure the trolley heads to the support member.

The trolley may include any quantity of any type of pivoting and/or locking mechanism (e.g., ratchet type mechanism, gears, rotation about a pin, etc.) disposed at any locations to pivot and/or lock the support member (e.g., one or more ends or intermediate sections of the support member may pivot and/or lock) within any desired orientation (e.g., generally between a horizontal and vertical orientation). The pivoting mechanism may be disposed at any desired locations on the support member.

It is to be understood that the terms "front", "rear", "side", "top", "bottom", "upper", "lower", "upward", "downward", "length", "width", "horizontal", "vertical" and the like are used herein merely to describe points of reference and do not limit the present invention to any particular configuration or orientation.

The present invention is not limited to the applications disclosed herein, but may be utilized with any type of rail or other system (e.g., conveyor system, etc.) to transport any types of articles. Further, a user or a lifting device or machine may manipulate the trolley to engage and/or disengage a trolley end from the rail or other system and place the trolley in a desired orientation. In addition, the trolley may be totally removed from the rail or other system and be utilized to suspend the articles from a support structure (e.g., wall, bar, etc.) within a storage facility or at a desired location.

From the foregoing description, it will be appreciated that the invention makes available a novel trolley device and method for transporting articles along a rail system, wherein the trolley device includes an article support member that pivots between orientations for article transportation and/or storage.

Having described preferred embodiments of a new and improved trolley device and method for transporting articles along a rail system, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A device to transport articles over a t sport system and facilitate storage of said articles comprising:

a support member to receive at least one article, wherein said support member includes first and second end portions, a plurality of rods configured to define a series of individual support receptacles along said support member to receive and support at least one article, and at least one covering support member to support a covering for said at least one article;

at least two engagement mechanisms to removably engage said transport system, wherein said first and second end portions of said support member each include at least one of said engagement mechanisms and wherein said device enables transport of said support member and said at least one article over said transport system; and a pivot mechanism coupling said support member to at least one of said engagement mechanisms to pivot said support member to at least two different orientations.

2. The device of claim 1, wherein said at least one article includes at least one garment.

3. The device of claim 1, wherein said at least two orientations include a substantially horizontal orientation and a substantially vertical orientation.

4. The device of claim 1, further including a rail system wherein said at least two engagement mechanisms include roller mechanisms to removably engage and traverse said rail system.

5. The device of claim 1, wherein said pivot mechanism includes a lock mechanism to lock said support member in at least one orientation.

6. A device to transport articles over a transport system and facilitate storage of said articles comprising:

a support member to receive at least one article, wherein said support member includes first and second end portions;

at least two engagement mechanisms to removably engage said transport system, wherein said first and second end portions of said support member each include at least one of said engagement mechanisms, and wherein said device enables transport of said support member and said at least one article over said transport system; and a pivot mechanism coupling said support member to at least one of said engagement mechanisms to pivot said support member to at least two different orientations;

wherein said pivot mechanism includes a coupling member an a plurality of slots defined within said support member, one of said slots including a curved configuration and one of said engagement mechanisms secured to said coupling member, and wherein said coupling member includes a plurality of slot traversal members each disposed within a respective slot in sliding relation to enable traversal of said slots by said slot traversal members and pivoting of said support member.

7. The device of claim 6, wherein said pivot mechanism includes a lock mechanism to lock said support member in at least one orientation, and wherein said lock mechanism includes at least one notch defined in said curved slot to receive and retain said corresponding slot traversal member.

8. A device to transport articles over a transport system and facilitate storage of said articles comprising:

a support member to receive at least one article, wherein said support member includes first and second end portions;

at least two engagement mechanisms to removably engage said transport system, wherein said first and second end portions of said support member each include at least one of said engagement mechanisms, and wherein said device enables transport of said support member and said at least one article over said transport system; and a pivot mechanism coupling said support member to at least one of said engagement mechanisms to pivot said support member to at least two different orientations;

wherein said support member includes a plurality of substantially parallel rods separated by a particular distance and at least one divider disposed between and attached to said substantially parallel rods, wherein one of said rods supports said at least one article when said support member is oriented in a substantially horizontal orientation and said at least one divider supports said at least one article when said support member is oriented in a substantially vertical orientation, and wherein said at least one divider includes a generally V-shaped configuration.

9. A method of transporting articles over a transport system and facilitating storage of said articles via a device including a support member, at least two engagement mechanisms to removably engage said transport system and a pivoting mechanism, said method comprising the steps of:

(a) supporting at least one article and a covering for said at least one article on said support member, wherein said support member includes a plurality of rods configured to define a series of individual support receptacles along said support member to receive and support at least one article, first and second end portions each including at least one of said engagement mechanisms, and at least one covering support member to support said covering; and (b) transporting said support member in a first orientation to a desired location over said transport system via said device, wherein said support member is pivotable to a second different orientation via a pivot mechanism coupling said support member at least one of said engagement mechanisms.

10. The method of claim 9, wherein said at least one article includes at least one garment.

11. The method of claim 9, wherein said transport system includes a rail system and said at least two engagement mechanisms include roller mechanisms to removably engage and traverse said rail system, and step (b) further includes:

(b.1) transporting said support member and said at least one article to a desired location over said rail system.

12. The method of claim 9, wherein said plurality of rods includes a plurality of substantially parallel rods separated by a particular distance and at least one divider disposed between and attached to said substantially parallel rods, and said method further includes:

(c) at said desired location, pivoting said support member from said first orientation to a second different orientation via said pivot mechanism for storage in a storage facility, wherein wherein step (c) further includes:

(c.1) supporting said at least one article from one of said substantially parallel rods when said support member is oriented in said first orientation and supporting said at least one article from said at least one divider when said support member is oriented in said second orientation.

13. The method of claim 9, wherein step (b) further includes:

(b.1) at a storage facility, pivoting said support member from said second orientation to said first orientation via said pivot mechanism for transport over said transport system; and (b.2) transporting said support member in said first orientation from said storage facility to said desired location over said transport system via said device.

14. The method of claim 9, further including:

(c) at said desired location, pivoting said support member from said first orientation to said second different orientation via said pivot mechanism for storage in a storage facility.

15. The method of claim 14, wherein said first and second orientations respectively include a substantially horizontal orientation and a substantially vertical orientation.

16. The method of claim 14, wherein said pivot mechanism includes a lock mechanism, and step (c) further includes:

(c.1) lifting said support member to disengage one of said engagement mechanisms from said transport system and unlock said lock mechanism to pivot said support member to said second orientation.

17. A method of transporting articles over a transport system via a device including a support member, at least two engagement mechanisms to removably engage said transport system and a pivoting mechanism, said method comprising the steps of:

(a) supporting at least one article and a covering for said at least one article on said support member, wherein said support member includes a plurality of rods configured to define a series of individual support receptacles along said support member to receive and support at least one article, first and second end portions each including at least one of said engagement mechanisms, and at least one covering support member to support said covering;

(b) pivoting said support member from a first orientation to a second different orientation via said pivot mechanism for transport over said transport system, wherein said pivot mechanism couples said support member to at least one of said engagement mechanisms; and (c) transporting said support member in said second orientation to a desired location over said transport system via said device.

18. The method of claim 17, wherein said at least one article includes at least one garment.

19. The method of claim 17, wherein said first and second orientations respectively include a substantially vertical orientation and a substantially horizontal orientation.

20. The method of claim 17, wherein said transport system includes a rail system and said at least two engagement mechanisms include roller mechanisms to removably engage and traverse said rail system, and step (c) further includes:

(c.1) transporting said support member and said at least one article to a desired location over said rail system via said device.

21. The method of claim 17, wherein said pivot mechanism includes a lock mechanism, and step (b) further includes:

(b.1) lifting and pivoting said support member to enable one of said engagement mechanisms to engage said transport system and lock said support member in said second orientation via said lock mechanism.

22. The method of claim 17, wherein said plurality of rods includes a plurality of substantially parallel rods separated by a particular distance and at least one divider disposed between and attached to said substantially parallel rods, and step (b) further includes:

(b.1) supporting said at least one article from said at least on divider when said support member is oriented in said first orientation and supporting said at east one article from one of said substantially parallel rods when said support member is oriented in said second orientation.

23. A method of transporting articles over a transport system and facilitating storage of said articles via a device including a support member, at least two engagement mechanisms to removably engage said transport system and a pivoting mechanism, said method comprising the steps of:

(a) supporting at least one article and a covering for said at least one article on said support member, wherein said support member includes a plurality of substantially parallel rods separated by a particular distance with at least one divider disposed between and attached to said substantially parallel rods, first and second end portions each including at least one of said engagement mechanisms and at least one covering support member to support said covering;

(b) transporting said support member in a first orientation to a desired location over said transport system via said device, wherein said support member is pivotable to a second different orientation via a pivot mechanism coupling said support member to at least one of said engagement mechanisms, and step (b) further includes:

(b.1) supporting said at least one article from one of said rod when said support member is oriented in said first orientation and supporting said at least one article from said at least one divider when said support member is oriented in said second orientation.

* * * * *